April 29, 1924.
H. BEISSER
ROTARY CUTTING TOOL
Filed Jan. 2, 1923
1,492,347
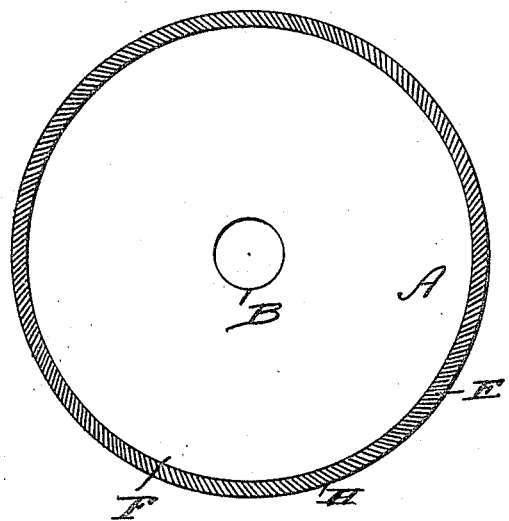
Fig. 1.
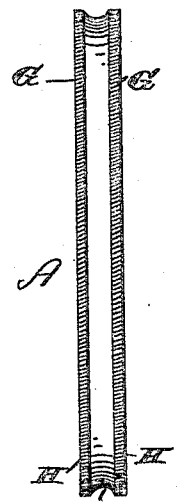
Fig. 2.
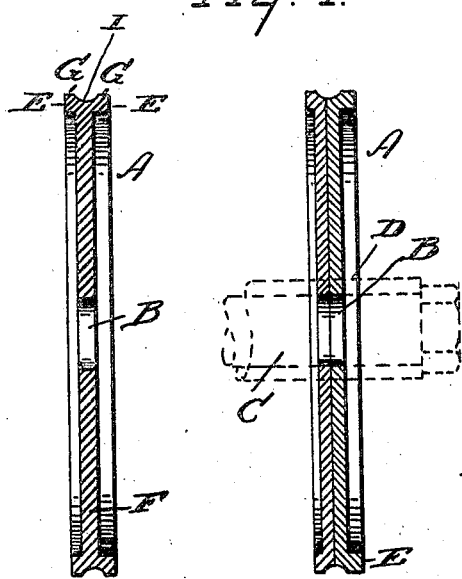
Fig. 3. Fig. 4.
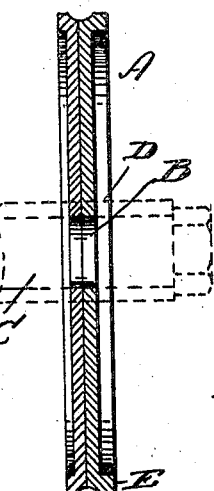
Fig. 5. Fig. 6.
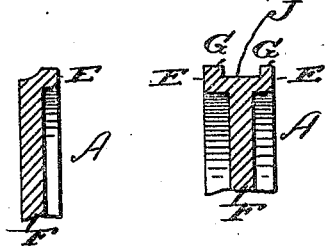
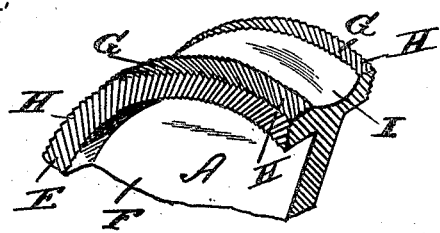
Fig. 7.
Inventor
Harry Beisser
By
Attorney Patented Apr. 29, 1924.

1,492,347

UNITED STATES PATENT OFFICE.

HARRY BEISSER, OF DETROIT, MICHIGAN.

ROTARY CUTTING TOOL.

Application filed January 2, 1923. Serial No. 610,402.

*To all whom it may concern:*

Be it known that I, HARRY BEISSER, a Russian citizen, residing at Detroit, county of Wayne, State of Michigan, have invented a certain new and useful Improvement in Rotary Cutting Tools, and declare the following to be a full, clear, and exact description of the same, such as will enable others skilled in the art to which it pertains to make and use the same, reference being had to the accompanying drawings, which form a part of this specification.

My invention relates to a rotary cutting tool shown in the accompanying drawings and more particularly described in the following specification and claims.

The object of my invention is to provide a rotary cutting tool constructed of high speed steel having cutting faces at right angles to each other whereby it is especially adapted for key cutting machines—the construction being such that two right angle surfaces may be cut at one or the same operation.

A further object of the invention is to provide a device adapted to co-ordinate with other like devices and to be assembled upon a mandrel or other rotary machine element for use as a cutting tool.

With the foregoing and other objects in view which will appear as the description proceeds the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation of the tool showing an annular projecting rim having a plurality of cutting teeth.

Figure 2 is an edge view of the tool having two cutting rims spaced apart.

Figure 3 is a central cross-sectional view through the device showing two projecting annular cutting flanges.

Figure 4 is a modification of the device showing two annular cutting tools, arranged in abutting relation upon a mandrel, or other rotatable element,—shown in dotted lines.

Figure 5 is a fragmentary cross-sectional view of one of the elements, shown in the preceding figure.

Figure 6 is a fragmentary cross-sectional view of a modification showing the tool provided with cutting rims of relatively different widths spaced apart, the recess between the cutting rims being angular instead of arc-shaped in cross-section as shown in the preceding views.

Figure 7 is a fragmentary perspective view showing the cutting surface provided on the edge and also the side of the tool.

Referring now to the letters of reference placed upon the drawings:—

A denotes a rotary cutting tool provided with a bore B to receive a mandrel C,—which may be provided with a key D,—as indicated in dotted lines in Figure 4,—extending into a slot projecting from the bore, whereby the tool may be rigidly secured to the mandrel.

E, E, are annular flanges projecting laterally from the web F of the tool. G, G, are rims spaced apart provided with cutting teeth H on the rims G, G, and the annular flanges E, E.

The tool may be provided with one or a plurality of cutting rims G if desired and when more than one rim is employed it may be spaced apart by either an arc-shaped groove I or an angular groove J,— as shown in Figure 6. When constructed as shown in the latter figure the tool may be used for cutting grooves corresponding in depth to that of the projecting rims of the cutting tool.

In Figure 4 I have indicated a modification in which two rotary cutting tools are assembled in contiguous relation upon a mandrel. It will also be obvious that any desired number of these tools may be arranged upon a shaft in adjacent or spaced relation to each other as may be required.

It will now be seen that the tool may be employed to cut two right-angle surfaces at the same operation or one or more grooves in the face, and annular grooves on the side of the element being operated on.

Having thus described my invention what I claim is:

1. A rotary disc cutting tool of the class described comprising a cutting rim and an annular projecting cutting flange with a central bore whereby it is adapted for longitudinal adjustment upon a spindle, and means for securing said rotary disc cutting tool to the spindle.

2. A rotary cutting tool of the class described comprising cutting rims spaced from each other in combination with an annular cutting flange at right angles to the cutting rims.

3. A rotary cutting tool of the class described comprising a cutting rim with annular cutting flanges projecting in opposite directions from the web of the tool, whereby a right and left right-angle cut may be made at one and the same operation.

In testimony whereof, I sign this specification in the presence of two witnesses.

HARRY BEISSER.

Witnesses:
S. G. THOMAS,
PATRICK J. MURPHY.